US012665240B2

(12) United States Patent
Woltmann et al.

(10) Patent No.: US 12,665,240 B2
(45) Date of Patent: Jun. 23, 2026

(54) COOLING DEVICE FOR A RECHARGEABLE BATTERY

(71) Applicant: Miba eMobility GmbH, Laakirchen (AT)

(72) Inventors: Pierre Woltmann, Ingolstadt (DE); Stefan Gaigg, Gmunden (AT); Thomas Haidwagner, Oberndorf (AT); Franz Poehn, Pettenbach (AT)

(73) Assignee: Miba eMobility GmbH, Laakirchen (AT)

( * ) Notice: Subject to any disclaimer, the term of this patent is extended or adjusted under 35 U.S.C. 154(b) by 578 days.

(21) Appl. No.: 18/028,868

(22) PCT Filed: Sep. 29, 2021

(86) PCT No.: PCT/EP2021/076781
§ 371 (c)(1),
(2) Date: Mar. 28, 2023

(87) PCT Pub. No.: WO2022/069537
PCT Pub. Date: Apr. 7, 2022

(65) Prior Publication Data
US 2023/0335832 A1 Oct. 19, 2023

(30) Foreign Application Priority Data
Sep. 29, 2020 (DE) ..................... 10 2020 125 451.2

(51) Int. Cl.
*H01M 10/6567* (2014.01)
*H01M 10/613* (2014.01)
*H01M 10/625* (2014.01)

(52) U.S. Cl.
CPC ..... *H01M 10/6567* (2015.04); *H01M 10/613* (2015.04); *H01M 10/625* (2015.04)

(58) Field of Classification Search
CPC ............. H01M 10/613; H01M 10/625; H01M 10/6567
See application file for complete search history.

(56) References Cited

U.S. PATENT DOCUMENTS

| | | | |
|---|---|---|---|
| 11,296,368 B2 | 4/2022 | Astecker et al. | |
| 11,355,799 B2 | 6/2022 | Schmitt et al. | |
| 2018/0178675 A1 | 6/2018 | Suzuki et al. | |

(Continued)

FOREIGN PATENT DOCUMENTS

| | | | |
|---|---|---|---|
| AT | 520 018 A1 | 12/2018 | |
| DE | 10 2017 210 343 A1 | 12/2018 | |

(Continued)

OTHER PUBLICATIONS

International Search Report in PCT/EP2021/076758, mailed Mar. 3, 2022.

(Continued)

*Primary Examiner* — Mayla Gonzalez Ramos
(74) *Attorney, Agent, or Firm* — Collard & Roe, P.C.

(57) ABSTRACT

A device for cooling or temperature control for at least one storage module of a rechargeable battery includes multiple coolant channels, through which a coolant flows in the same direction, and at least one of the coolant channels includes a cross-sectional constriction element with a passage cross-section for the coolant.

15 Claims, 3 Drawing Sheets

(56)     References Cited

U.S. PATENT DOCUMENTS

Figure 1:
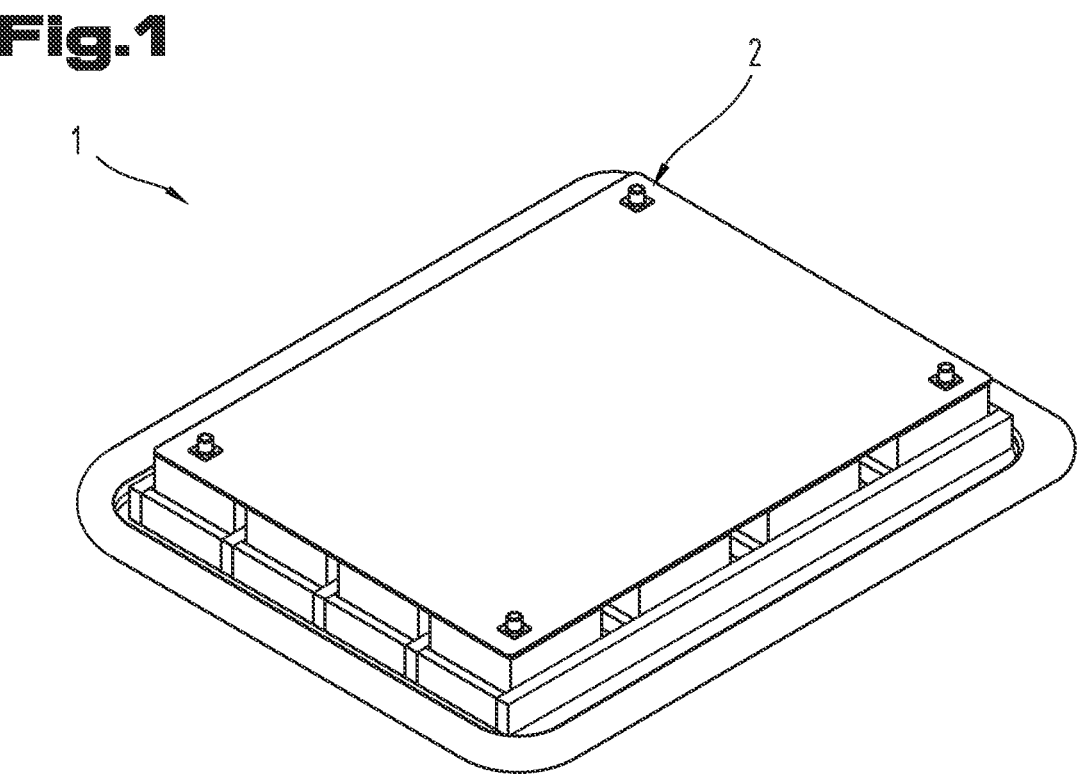

2020/0106146  A1 *    4/2020   Schmitt ............... H01M 10/625
2021/0184291  A1      6/2021   Gaigg et al.

FOREIGN PATENT DOCUMENTS

DE      10 2018 216708  A1      4/2020
KR         2016 0065637  A      6/2016
WO          2020/041810  A1      3/2020

OTHER PUBLICATIONS

International Search Report in PCT/EP2021/076781, mailed Jan. 4, 2022.

* cited by examiner

COOLING DEVICE FOR A RECHARGEABLE BATTERY

CROSS REFERENCE TO RELATED APPLICATIONS

This application is the National Stage of PCT/EP2021/076781 filed on Sep. 29, 2021, which claims priority under 35 U.S.C. § 119 of German Application No. 10 2020 125 451.2 filed on Sep. 29, 2020, the disclosure of which is incorporated by reference. The international application under PCT article 21(2) was not published in English.

The invention relates to a device for cooling or temperature control for at least one storage module of a rechargeable battery, wherein the device comprises multiple coolant channels, which are flown through by a coolant in the same direction.

The invention further relates to a rechargeable battery having at least one storage module for electrical energy and at least one device for cooling or temperature control for the at least one storage module.

Moreover, the invention relates to a vehicle having at least one rechargeable battery.

The invention also relates to a method for producing a device for cooling or temperature control for at least one storage module of a rechargeable battery, wherein multiple coolant channels are formed in the device, which coolant channels are flown through by a coolant in the same direction.

The service life and effectiveness as well as the safety of a rechargeable battery for e-mobility depend, among other factors, on the temperature during operation. For this reason, various concepts have been suggested for the cooling and/or temperature control of the rechargeable batteries. These concepts can be divided into essentially two types, namely air cooling and water cooling and/or in general cooling with liquids.

For water cooling, cooling bodies in which at least one coolant channel is formed are used. These cooling bodies are arranged between the individual modules of the rechargeable battery or on the modules. In this regard, a module is an individual unity of the rechargeable battery, i.e. not obligatorily just a cell.

In the arrangement on the modules, the cooling bodies are usually designed such that they cover all modules of the rechargeable battery. However, this results in the problem that due to tolerances etc. the cooling body does not lie against the modules evenly. To remedy this, the cooling body is screwed to each individual module. However, this entails the disadvantage that the production of the rechargeable battery is correspondingly complex and thus cost-intensive. This, in turn, impairs the acceptance of e-mobility per se.

Besides such cooling bodies, cooling devices, which are flexible and can thus adapt to the underground, already have been described in the prior art. AT 520 018 A1, for example, describes a rechargeable battery having at least one storage module for electrical energy and at least one cooling device for cooling or temperature control for the at least one storage module, wherein the cooling device comprises at least one coolant channel, at least one coolant inlet and at least one coolant outlet, and wherein the cooling device comprises single-layer or multi-layer films. The coolant channel is formed by the films and between these. Furthermore, the cooling device rests on the at least one storage module with one of the films.

In general, the problem with such coolers is that different volume flows can occur across the overall cooler. This leads to differently cooled cells of the rechargeable battery, which in turn reduces the performance of the rechargeable battery over the period of its use due to different aging of its cells. To counteract this, the fluid channels under the modules are designed to be very long in order to achieve a high pressure drop, which enables uniformity. It is also possible to provide that the length of the coolant channels is configured according to the Teichelmann principle.

The present invention is based on the object of improving the usability of the described cooling device in an electric vehicle and/or the cooling of a battery in an electric vehicle.

The object of the invention is achieved with the initially mentioned device, which has a cross-sectional constriction element with a minimum passage cross-section for the coolant in at least one of the coolant channels.

Furthermore, the object of the invention is achieved in the initially mentioned battery in that it comprises the device for cooling or temperature control for at least one storage module according to the invention.

Moreover, the object of the invention is achieved in the initially mentioned vehicle which comprises the battery according to the invention.

The object of the invention is also achieved with the initially mentioned method, according to which it is provided that a cross-sectional constriction element with a minimum passage cross-section for the coolant is arranged in at least one of the coolant channels.

Due to the cross-sectional constriction provided in the at least one coolant channel, an increased pressure drop is generated. This makes it possible to achieve at least approximately the same flow rate (volume flow per time unit) in the coolant channels. This means that very long channels or complex coolant routing outside the battery can be dispensed with. In addition, some of the weld seams required for very long coolant channels can be dispensed with, thus reducing the risk of leaks in the coolant circuit. Furthermore, this at least approximate equalization of the volume flows through the coolant channels with the same flow direction can be achieved by relatively simple means, whereby the production of the device and/or the cooling system comprising it can be simplified.

According to one embodiment variant of the invention, it may be provided that the cross-sectional constriction element is an element inserted into the coolant channel. It is thus possible to adapt the cross-sectional constriction element more easily to the higher material loads caused by the cross-sectional constriction without having to modify the entire device in this regard. In addition, this allows the cross-sectional constriction element to be placed more flexibly in the device, which means that a higher degree of prefabrication of the device or device of different sizes can be constructed with a higher number of identical parts. In addition, this makes it easier to maintain a minimum flow cross-section even when the device is largely made of a flexible material.

According to another embodiment variant of the invention, it may be provided that the cross-sectional constriction element is formed by a deformation of the coolant channel. With this embodiment variant, a mix of materials and the associated problems can be more easily avoided. In addition, the formation of the cross-sectional constriction element can already be carried out during the production of the coolant channels, whereby additional work steps for the production of the device optionally can be avoided.

However, according to a further embodiment variant of the invention, it can also be provided that it comprises both a cross-sectional constriction element inserted into a coolant channel and a cross-sectional constriction element formed by deformation of the coolant channel, whereby a combination of the effects described above can be achieved.

According to another embodiment variant of the invention, it may be provided that the device comprises a first single-layer or multi-layer film forming part of the coolant channels. An advantage of this is that the flexible film fits better to the surfaces of the rechargeable battery and/or its storage modules for electrical energy, whereby the heat transfer into the coolant can be improved. Moreover, a reduction in weight can be achieved by the film, which can serve to improve the effectiveness of the e-mobility by higher ranges. These effects have a direct influence on the cooling of the battery, since both effects allow for a reduction of the cooling power. This, in turn, facilitates the simple homogenization of the volume flow of coolant which flows through the coolant channels.

For the further improvement of these effects, according to a further embodiment variant of the invention, it can be provided that the device comprises a further single-layer or multi-layer film which forms the coolant channels together with the first single-layer or multi-layer film.

In a simple embodiment of the cross-sectional constriction element, according to an embodiment variant of the invention, it can be provided that it is configured so as to be bezel-shaped.

However, a further embodiment variant of the invention offers greater adaptability of the volume flow change and/or volume flow adaptation, according to which it can be provided that the cross-sectional constriction element is designed with a continuously decreasing passage cross-section for the coolant. This continuously decreasing passage cross-section also allows for the formation of a favorable flow profile in the coolant channels.

For further improvement of the flow conditions, according to a further embodiment variant of the invention, it can be provided that the cross-sectional constriction element is formed with a continuously increasing passage cross-section for the coolant behind the minimum passage cross-section for the coolant.

According to another embodiment variant of the invention, it can be provided that the cross-sectional constriction element has a length in the flow direction, wherein a ratio of length to smallest dimension of the passage cross-section is between 2 and 10, since in this range a good adaptability of volume flow and pressure loss in the coolant channels of the device can be achieved.

A better connection of the cross-sectional constriction element to the walls of the coolant channels can be achieved if the cross-sectional constriction element, according to a further embodiment variant, consists at least partially of at least one plastic material.

Hence, according to an embodiment variant of the method, it is optionally also possible that the cross-sectional constriction element is arranged in the coolant channels already during their formation and is, in particular, connected to these.

For the purpose of better understanding of the invention, it will be elucidated in more detail by means of the figures below.

Figure 2:
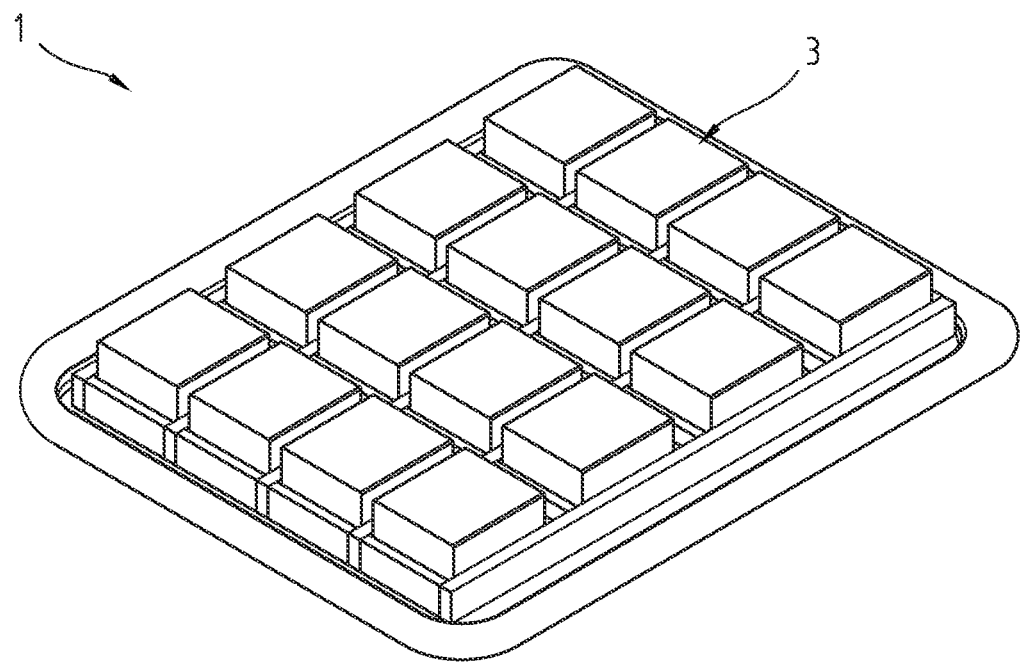
Figure 3:
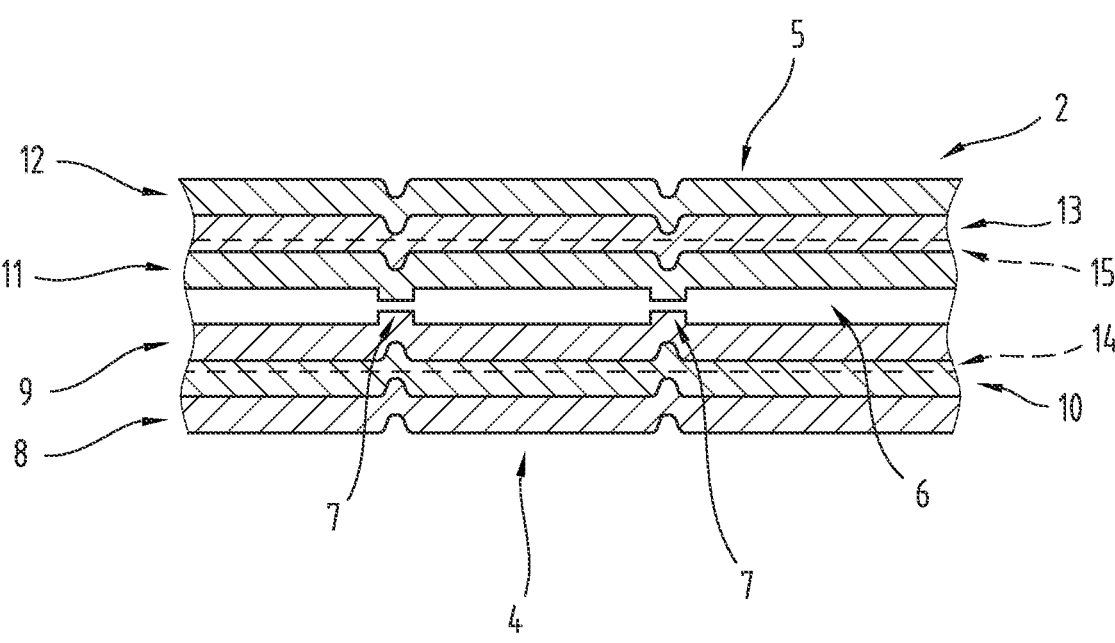
Figure 4:
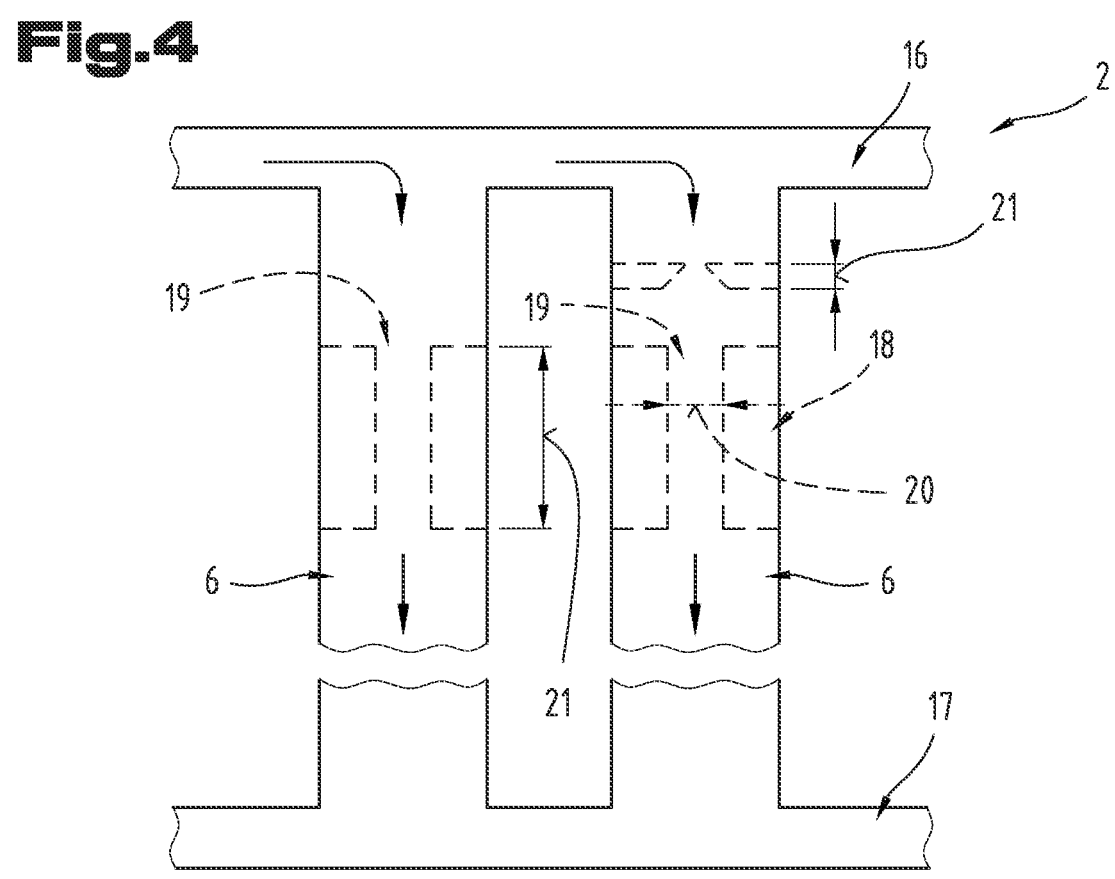
Figure 5:
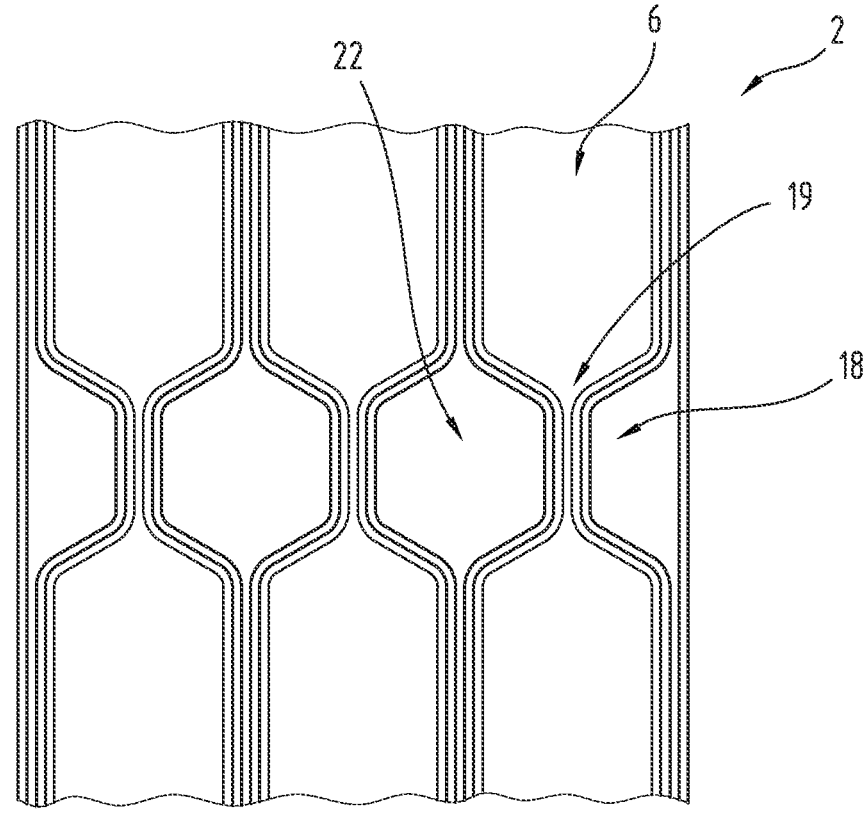
Figure 6:
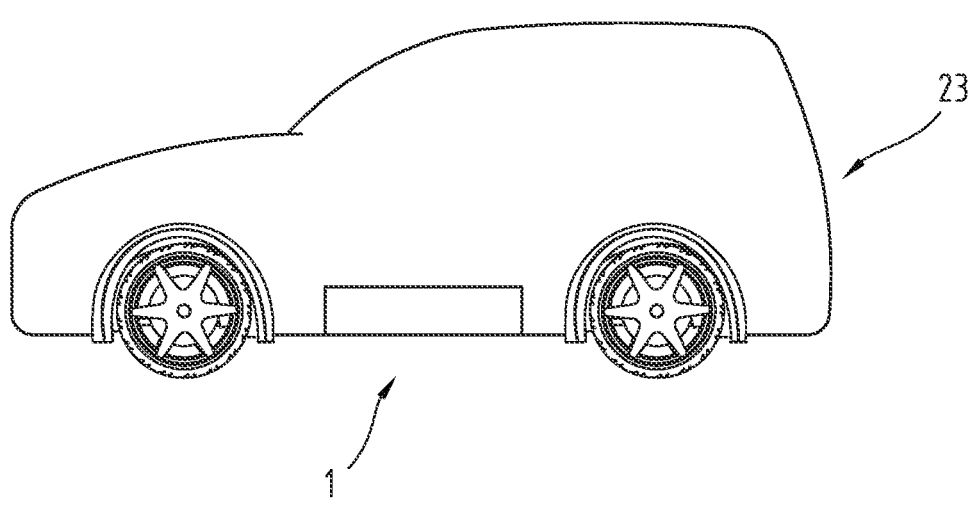

These show in a simplified schematic representation:

FIG. 1 a rechargeable battery in an oblique view with a cooling device;

FIG. 2 the battery according to FIG. 1 in an oblique view without a cooling device;

FIG. 3 a section of a cooling device in cross-section;

FIG. 4 a section from a first embodiment variant of the cooling device with a cross-sectional constriction element;

FIG. 5 a section from a further embodiment variant of the cooling device with a cross-sectional constriction element;

FIG. 6 a vehicle with a rechargeable battery.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIGS. 1 and 2 show a rechargeable battery 1, also referred to as accumulator (hereinafter merely referred to as battery 1), in an oblique view, wherein FIG. 1 shows the battery 1 with a device 2 for cooling or temperature control (hereinafter merely referred to as device 2) and FIG. 2 shows the battery 1 without this device 2.

The battery 1 comprises multiple storage modules 3 for electrical energy. In the represented example there are 16 storage modules 3. However, this number is not to be considered restricting.

The storage modules 3 may comprise multiple cells.

As the basic construction of such batteries 1 for e-mobility is known from the prior art, reference is made thereto so as to avoid repetitions.

As can be seen from the comparison of the two FIGS. 1 and 2, the device 2 is arranged on a side of the battery 1, in particular on the top. However, it may also be provided that the device 2 is arranged at multiple sides of the battery 1 and extends across at least two surfaces of the battery 1, for example on the top and laterally and optionally on the bottom.

The device 2 may extend across all storage modules 3, in particular their upper sides (as can be seen from FIG. 1) such that all storage modules 3 can be cooled by means of just one device 2. However, in general, it is also possible to provide multiple devices 2 in the battery 1 and/or on the battery 1, for example two or three or four, such that for example the storage modules 3 are distributed to two or three or four, etc. devices 2.

Reference is made to the fact that the terms upper side etc. refer to the installation position the battery 1 in a vehicle and/or motor vehicle.

FIG. 3 shows a section from an embodiment variant of the device 2 in cross-section.

The device 2 may comprise a first single-layer or multi-layer film 4 according to this embodiment variant. By means of this first film 4, the device 2 may lie, in particular directly, against the storage module 3 or the storage modules 3. The contact is for example established at the upper side of the storage modules 3, as was elucidated above. As the first film 4 is flexible, i.e. not stiff, said first film 4 can better adapt to surface irregularities of the storage modules 3 or between the storage modules 3. A leveling compound between the device 2 and the storage modules 3 is not required. Hence, heat transmission from the storage modules 3 into the device 2 can be improved.

In the embodiment variant of the device 2 according to FIG. 3, this first film 4 is connected to a further film 5. Said further film 5 is also configured so as to have multiple layers, but can also be configured so as to have merely one layer. Between the further film 5 and the first film 4, multiple coolant channels 6 are formed. For this purpose, the further film 5 may be connected to the first film 4 via webs 7. The webs 7 may, for example, be formed during the connection of the first to the further film 4, 5, e.g. by heat sealing or gluing. However, embodiments of the device 1 without these webs 7 are also possible.

Moreover, it is possible that the device 2, in place of the further film 5, comprises a stiff element, for example the covering of the battery 1, with which the first film 4 is connected. In this case, the coolant channels 6 are partially formed by the first film 4 and partially formed by said stiff element. The connection between the first film 4 and the stiff element for forming the coolant channels 6 may be established via the webs 7. The stiff element may, for example, consist of a metal or a plastic material, such as a thermosetting plastic or a thermoplastic.

According to another embodiment variant, it may also be provided that the device comprises neither the first nor the further film 4, 5 but merely a stiff element, for example made of a metal.

The first film 4 may be adhered to the further film 5 or to the stiff element. However, other connecting techniques may also be applied to connect the first film 4 to the further film 5 or to the stiff element. The connecting techniques are preferably selected such that no additional measures need to be taken to obtain a liquid-tight design of the connection.

The respectively optimized extent of the coolant channels 6 is among other factors determined by the amount of heat that needs to be conducted away, the geometry of the battery 1, etc.

As already mentioned, the first film 4 and/or the further film 5 may also be configured to have multiple layers. In particular, they may consist of a laminate.

In the preferred embodiment variant, the first film 4 comprises or consists of a first plastic layer 8, a second plastic layer 9, and a layer 10 arranged between the two plastic layers. As already mentioned, however, the first film 4 may also be configured so as to have merely one layer and then comprises the first plastic layer 8, which is optionally configured so as to be (fiber-) reinforced.

If the further film 5 has the same structure, it may comprise or consist of a first plastic layer 11, a second plastic layer 12, and a layer 13 arranged between the two plastic layers. However, it may also consist of only one of the or both, optionally (fiber-) reinforced, plastic layer(s) 11, 12.

Optionally, the first film 4 and/or the further film 5 may have an enforcement layer 14, 15, which is in particular connected to the first plastic layer 8, 11, which may also be connected to or replace the layer 10, 13. It is also possible that the first plastic layer 8, 11 or the second plastic layer 9, 12 is replaced by the enforcement layer 14, 15.

In general, other laminates can be used as well. For example, merely the first film 4 may be provided with the layer 10 or merely the further film 5 may be provided with the layer 13. Likewise, structures of the first film 4 and/or the further film 5 with two layers or with more than three layers are possible. However, preferably, the film 4 and the further film 5 are designed equally.

In this embodiment variant, the coolant channels 6 are not formed by separate components, but by the just partial connection of the first film 4 to the further film 5 or to the stiff element. The wall or the walls of the at least one coolant channel 6 are thus formed by the first film 4 and the further film 5 or the stiff element, preferably half by each.

The layer 10, 13 may be electrically conductive. It may, for example, consist of an electrically conductive plastic material, an electrically conductive elastomer, or be made of an electrically conductive paint. For this purpose, electrically conductive particles, such as graphite, metal particles, etc., may be mixed into the respective base material. The layer 10, 11 may also be formed as a metal layer or as a metallized plastic layer.

The first plastic layer(s) 8, 11 and/or the further plastic layer(s) 9, 12 and/or the metalized plastic layers preferably consists/consist to at least 80 wt. %, in particular at least 90 wt. %, of a thermoplastic material or of an elastomer. The thermoplastic material may, for example, be selected from a group comprising and/or consisting of polyethylene (PE), polyoxymethylene (POM), polyamide (PA), in particular PA 6, PA 66, PA 11, PA 12, PA 610, PA 612, polyphenylene sulfide (PPS), polyethylene terephthalate (PET), crosslinked polyolefins, preferably polypropylene (PP). The elastomer may, for example, be selected from a group comprising and/or consisting of thermoplastic elastomers such as thermoplastic vulcanizates, olefin-, amine-, ester-based thermoplastic polyurethanes, in particular ether-based/ester-based thermoplastic elastomers, styrene block copolymers, silicone elastomers.

At this point, it should be noted that the term plastic material is understood as a synthetic or natural polymer produced from corresponding monomers.

Preferably, the first plastic layer(s) 8, 11 and/or the further plastic layer(s) 9, 12 and/or the metalized plastic layer(s)/ consist of a so-called sealing film. This has the advantage that the respective layers can be connected to one another directly.

However, it is also possible to use other plastic materials, such as thermosetting plastic materials and/or thermosetting materials, which are then for example adhered to one another by means of an adhesive. Two-part adhesive systems based on polyurethane or silicone or hot melt adhesive systems are particularly suitable for this purpose.

It should be noted at this point that, in order to produce the first and/or the further film 4, 5, individual films made of the respective materials can be used which are bonded together.

Preferably, the possibly present enforcement layer(s) 14, 15 comprise/comprises or consist/consists of a fiber reinforcement which is preferably formed as a separate layer. The fiber reinforcement can be formed of fibers and/or threads, which are selected from a group comprising or consisting of glass fibers, aramid fibers, carbon fibers, mineral fibers such as basalt fibers, natural fibers such as hemp, sisal and combinations thereof.

Preferably, glass fibers are used as fiber reinforcement. The proportion of the fibers, in particular the glass fibers, in the fiber reinforcement can amount to at least 80 wt. %, in particular at least 90 wt. %. Preferably, the fibers and/or threads of the fiber reinforcement consist merely of glass fibers.

The fibers and/or threads can be present in the fiber reinforcement as roving, for example as a non-woven fabric. However, preferably the fibers and/or threads become a woven fabric or a knitted fabric. In this regard, it is also possible that the woven or knitted fabric is merely present in some regions and that the remaining regions of the fiber reinforcement are formed by a roving.

It is also possible that rubberized fibers and/or threads are used as or for the fiber reinforcement.

When using a woven fabric, different types of weaves are possible, in particular plain, twill or satin weave. Preferably, a plain weave is used.

However, it is also possible to use an open-mesh glass fabric or glass roving.

Coated paper can also be used as fiber reinforcement. The paper is equipped to be resistant to liquids by the coating.

In the alternative or in addition to the fiber reinforcement, the enforcement layer(s) 14, 15 can comprise a mineral filling. For example, calcium carbonate, talc, quartz, wollastonite, kaolin or mica can be used as a mineral filling (mineral filler material).

The metal layer is, in particular, formed from aluminum and/or consists thereof. However, other materials such as copper or silver can also be used.

The metal layer may have a layer thickness of between 5 µm and 200 µm in particular of between 60 µm and 200 µm.

The plastic layers 8, 9, 11, 12 may have a layer thickness of between 10 µm and 200 µm.

The layer thickness of the enforcement layer(s) 14, 15 may amount to between 5 µm and 50 µm.

Although the films 4, 9 can in general be used in the form of individual films for producing the device 2, such that the film laminate(s) are only formed in the course of the production of the device 2, it is advantageous if the films 4, 9 are used as a (laminated) semi-finished product.

For connecting the individual layers of the laminate or the laminates, these can be adhered to one another by means of adhesives. The afore-mentioned adhesives are suitable for this purpose. Besides adhesives, coextrusion and extrusion coating can also be used as joining options. Of course, a combination is also possible in which several plastic materials are coextruded and adhesively laminated to one another with an extrusion-coated metal or (fiber) enforcement layer. In general, all known methods can be used for producing composite films and/or film laminates.

FIG. 4 shows a section from an embodiment variant of the device 2. In addition to the multiple coolant channels 6 (only two coolant channels 6 are shown, although this number is not to be understood as limiting), the device has a supply channel 16 and a discharge channel 17. The coolant is supplied to the coolant channels 6 via the supply channel 16 and discharged again via the discharge channel 17. The coolant channels 6 branch off from the supply channel 16 and open into the discharge channel 17.

The device 2 may also have more than one supply channel 16 and/or more than one discharge channel 17, such that in this case the coolant channels 6 may be divided among multiple flow fields.

As illustrated by arrows in FIG. 4, the coolant flows in the same direction in the coolant channels 6. In particular, the coolant channels 6 are aligned parallel to each other (within production tolerances). However, the coolant channels 6 can also run in mutually different directions, wherein, also in this case, the flow direction of the coolant in the coolant channels 6 is also to be considered equal if these coolant channels 6 branch off from a common supply channel 16 and open into a common discharge channel 17.

At least one cross-sectional constriction element 18 is arranged in each of the coolant channels 6. The cross-sectional constriction element 18 comprises a passage orifice 19 for the coolant. The passage orifice 19 has a passage cross-section. The passage cross-section may, for example, be square, rectangular, hexagonal, or generally polygonal. Preferably, however, the passage cross-section is circular and has a diameter 20. Furthermore, the cross-sectional constriction element 18 has a length 21 in the flow direction of the coolant.

Within the scope of the invention, it is generally possible for only one or more or all of the multiple coolant channels

6 to have one cross-sectional constriction element 18 or multiple cross-sectional constriction elements 18. Furthermore, the cross-sectional constriction elements 18 in FIG. 1 are substantially equally placed in each of the coolant channels 6. However, they may also be placed at different locations in the coolant channels 6. Moreover, the cross-sectional constriction elements 18 in FIG. 4 are formed in the same way. However, they can also be different, for example have a different length 21 and/or a different passage cross-section with respect to size and/or shape, in particular a different diameter.

The at least one cross-sectional constriction element 18 is used in the coolant channels 6 for matching and/or adapting the volume flows of coolant through the coolant channels 6, i.e. between supply channel 16 and discharge channel 17. For the formation of at least approximately equal volume flows, the person skilled in the art can determine the respective specific placement of the cross-sectional constriction element 18 in the respective coolant channel 6 and/or the specific shape or size of the passage cross-section for a specific application on the basis of a few tests. This placement and/or formation of the cross-sectional constriction element 18 also depends, among other things, on the number and/or length of the coolant channels 6, etc.

According to an embodiment variant of the invention, however, it is provided that the cross-sectional constriction element 18 or the cross-sectional constriction elements 18 have a ratio of the length 21 to the smallest dimension of the passage cross-section, in particular to the smallest diameter 20, between 2 and 10, in particular between 2 and 7.

In FIG. 4, two embodiment variants of the cross-sectional constriction element 18 are shown in the right-hand coolant channel 6, namely a bezel-shaped embodiment variant (upper cross-sectional constriction element 18) and a cylindrical embodiment variant (lower cross-sectional constriction element 18). The bezel-shaped cross-sectional constriction element 18 preferably has a length 21 in the flow direction of the coolant which is at most 1.5 times the smallest dimension of the passage cross-section.

The shape of the cross-sectional constriction element 18 may also differ from the bezel shape or cylindrical shape. For example, the cross-sectional constriction element 18 may also be cuboidal or cube-shaped. In other words, the invention is not limited to the mentioned shapes of the cross-sectional constriction element 18.

Within the scope of the invention, the passage orifice 19 may be formed with a constant size of the cross-sectional area (in FIG. 4, the lower cross-sectional constriction element 18) or with a changing size of the cross-sectional area (in FIG. 4, the bezel-shaped upper cross-sectional constriction element 18).

In the bezel-shaped embodiment, the passage orifice preferably becomes larger in the flow direction of the coolant.

In FIG. 5, a section from a further embodiment variant of the device 2 is shown. In this embodiment variant, the narrowing of the flow cross-section of the coolant channels 6 does not occur abruptly, as is the case in the embodiment variants according to FIG. 4, but instead the passage cross-section of the cross-section narrowing element 18 decreases steadily in the flow direction. The decrease can be linear or in accordance with another mathematical function, for example exponential.

According to a further embodiment variant of the invention, which is also shown in FIG. 5, it can be provided that the cross-sectional constriction element 18 is also formed with a continuously increasing passage cross-section (i.e. with a continuously increasing size of the passage cross-section) for the coolant. The section of the cross-sectional constriction element 18 with the continuously increasing passage cross-sectional area may immediately follow the section with a continuously decreasing passage cross-sectional area or immediately follow a section with a constant size of the passage cross-sectional area (as shown in FIG. 5).

Preferably, the sections with the decreasing and increasing size of the passage cross-section area have the same length in the flow direction of the coolant. However, they may also have different lengths. In particular, the cross-sectional constriction element 18 is formed symmetrically with respect to the change in the size of the cross-sectional area of the passage orifice 19. For example, the cross-sectional constriction element 18 may be hourglass-shaped.

As shown in FIG. 5, transitions into and out of the cross-sectional constriction element 18 may be rounded.

According to an embodiment variant of the invention, the cross-sectional constriction element 18 may be formed as a separate element and be inserted into the coolant channel 6, as is the case, for example, with the embodiment variant according to FIG. 4. Preferably, in this regard, the cross-sectional constriction element 18 consists at least partially of at least one plastic material, in particular of a plastic material mentioned above with respect to the films 4, 5.

According to another embodiment variant, it may also be provided that the cross-sectional constriction element 18 is formed by a deformation of the coolant channel 6 itself. This embodiment variant is shown as an example in FIG. 5. In this case, the cross-sectional constriction element 18 can be formed, for example, by the controlled indentation of a metallic coolant channel 6 to form a constriction. In the preferred embodiment variant of the invention, however, the device 2 is formed with the two aforementioned single-layer or multilayer films 4, 5. In this case, the two films 4, 5 are only partially joined to one another, as has been described. In order to form the at least one cross-sectional constriction element 18, connection areas 22 in these sections are formed larger than in the remaining connecting sections of the films 4, 5 with each other. However, it is also possible to not change the routing of the connection areas accordingly, such that it is not necessary to form a full-surface connection in the connection areas 22.

When forming the cross-sectional constriction element 18 by deforming the respective coolant channel 6, it is preferably already formed in the respective coolant channel 6 during the formation thereof. This can also be done with a separate element as a cross-sectional constriction element 18, for example by placing it on one of the two films 4, 5, and then partially joining the two films 4, 5 to form the coolant channels 6. In this case, the cross-sectional constriction element 18 can also be glued onto at least one of the two films 4, 5. The same applies if the device 2 is manufactured with only one of the two films 4, 5 and a stiff element is used in place of the other film 4, 5, as explained above.

However, it is also possible that a cross-sectional constriction element 18 formed as a separate element is inserted into a coolant channel 6 formed from the two films 4, 5 or with at least one of the two films 4, 5 and is connected in particular to at least one of the two films 4, 5, in particular to both of them. The connection may be made, for example, thermally or by means of an adhesive, as described above with respect to the connection of the two films 4, 5 to one another and/or to the formation of the laminates for the films 4, 5.

According to a further embodiment variant, it can also be provided that it comprises both a cross-sectional constriction element 18 inserted into a coolant channel 6 and a cross-sectional constriction element 18 formed by deformation of the coolant channel 6.

As already mentioned, the device 2 is preferably used in a vehicle, in particular a motor vehicle. For the sake of completeness only, such a vehicle 23 with a built-in battery 1 is shown in FIG. 6. The battery 1 may be held by at least one holding element.

For the sake of completeness only, it should be noted that the cooling fluid can be a liquid, such as water in particular, or a gas.

The exemplary embodiments show possible embodiment variants of the device 2 and/or the battery 1, and it should be noted in this respect that the invention is not limited to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure of the device 2 and/or the battery 1, these are not obligatorily depicted to scale.

LIST OF REFERENCE NUMBERS

1 Battery
2 Device
3 Storage module
4 Film
5 Film
6 Coolant channel
7 Web
8 Plastic layer
9 Plastic layer
10 Layer
11 Plastic layer
12 Plastic layer
13 Layer
14 Enforcement layer
15 Enforcement layer
16 Supply channel
17 Discharge channel
18 Cross-sectional constriction element
19 Passage
20 Diameter
21 Length
22 Connection area
23 Vehicle

The invention claimed is:
1. A device (2) for cooling or temperature control for at least one storage module (3) of a rechargeable battery (1), wherein the device (2) comprises multiple coolant channels (6), which are flown through by a coolant in the same flow direction, and wherein at least one of the coolant channels (6) comprises a cross-sectional constriction element (18) with a passage orifice (19) having a passage cross-section for the coolant for increasing pressure loss and for equalizing volume flows through the coolant channels with the same flow direction.

2. The device (2) according to claim 1, wherein the cross-sectional constriction element (18) is an element which is inserted into the coolant channel (6).

3. The device (2) according to claim 1, wherein the cross-sectional constriction element (18) is formed by a deformation of the coolant channel (6).

4. The device (2) according to claim 3, comprising both a cross-sectional constriction element (18) inserted into a coolant channel (6) and a cross-sectional constriction element (18) formed by deformation of the coolant channel (6).

5. The device (2) according to claim 1, comprising a first single-layer or multi-layer film (4) which forms a part of the coolant channels (6).

6. The device (2) according to claim 5, comprising a further single-layer or multi-layer film (5) which forms the coolant channels (6) together with the first single-layer or multi-layer film (4).

7. The device (2) according to claim 1, wherein the cross-sectional constriction element (18) is configured so as to be bezel-shaped.

8. The device (2) according to claim 1, wherein the cross-sectional constriction element (18) is formed with a continuously decreasing passage cross-section for the coolant.

9. The device (2) according to claim 8, wherein the cross-sectional constriction element (18) is formed with a continuously increasing passage cross-section for the coolant behind the minimum passage cross-section for the coolant.

10. The device (2) according to claim 1, wherein the cross-sectional constriction element (18) has a length (21) in the flow direction, wherein a ratio of the length (21) to the smallest dimension of the passage cross-section is between 2 and 10.

11. The device (2) according to claim 1, wherein the cross-sectional constriction element (18) is made up at least partially of at least one plastic material.

12. A rechargeable battery (1) having at least one storage module (3) for electrical energy and at least one device (2) for cooling or temperature control for the at least one storage module (3), wherein the device (2) is configured according to claim 1.

13. A vehicle (22) having at least one rechargeable battery (1), wherein the rechargeable battery (1) is configured according to claim 12.

14. A method for producing a device (2) for cooling or temperature control for at least one storage module (3) of a rechargeable battery (1), wherein multiple coolant channels (6) are formed in the device (2), which are flown through by a coolant in the same flow direction, wherein a cross-sectional constriction element (18) with a passage orifice having a minimum passage cross-section for the coolant is arranged in at least one of the coolant channels (6) for increasing pressure loss and for equalizing volume flows through the coolant channels with the same flow direction.

15. The method according to claim 14, wherein the cross-sectional constriction element (18) is arranged in the coolant channels (6) while the coolant channels (6) are formed.

* * * * *